United States Patent
Tsunoda

(10) Patent No.: US 8,126,328 B2
(45) Date of Patent: Feb. 28, 2012

(54) COMMUNICATION APPARATUS AND SIGNAL TRANSMITTING METHOD

(75) Inventor: Yukito Tsunoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 39 days.

(21) Appl. No.: 12/320,795

(22) Filed: Feb. 4, 2009

(65) Prior Publication Data

US 2009/0148167 A1    Jun. 11, 2009

Related U.S. Application Data

(63) Continuation of application No. PCT/JP2006/318638, filed on Sep. 20, 2006.

(51) Int. Cl.
*H04J 4/00* (2006.01)
*H04J 14/08* (2006.01)

(52) U.S. Cl. .............. 398/75; 398/98; 398/47; 370/442; 370/498

(58) Field of Classification Search .............. 398/98, 398/99, 100, 75, 76, 77, 78, 102, 72, 71, 398/70, 66, 63, 47, 52; 370/498, 458, 442, 370/437, 432, 478
See application file for complete search history.

(56) References Cited

U.S. PATENT DOCUMENTS 4,213,011 A * 7/1980 Hoelzl et al. .................. 370/513
(Continued)

FOREIGN PATENT DOCUMENTS

JP    06-006321    1/1994
(Continued)

OTHER PUBLICATIONS

International Search Report mailed on Dec. 26, 2008 in connection with International Application PCT/JP2006/318638.
(Continued)

*Primary Examiner* — M. R. Sedighian
(74) *Attorney, Agent, or Firm* — Staas & Halsey LLP

(57) ABSTRACT

A communication apparatus time-division multiplexes a first signal transmitted at a first bit rate and a second signal transmitted at a second bit rate which is an integer multiple of the first bit rate, and sends out the first signal and the second signal to one line. The communication apparatus includes a pulse generating unit and a pulse superimposing unit. The pulse generating unit generates repetitive pulses having a width equal to a width of the first signal. The pulse superimposing unit superimposes the pulses generated by the pulse generating unit on the second signal.

10 Claims, 11 Drawing Sheets

U.S. PATENT DOCUMENTS

| | | | |
|---|---|---|---|
| 5,363,370 A | 11/1994 | Abiven | |
| 6,178,022 B1 | 1/2001 | Yoneyama | |
| 6,486,990 B1 * | 11/2002 | Roberts et al. | 398/98 |
| 2002/0089737 A1 | 7/2002 | Sugata et al. | |
| 2003/0128414 A1 | 7/2003 | Watanabe et al. | |

FOREIGN PATENT DOCUMENTS

| | | |
|---|---|---|
| JP | 8-8954 | 1/1996 |
| JP | 9-36828 | 2/1997 |
| JP | 10-173634 | 6/1998 |
| JP | 10-262074 | 9/1998 |
| JP | 2000-49823 | 2/2000 |
| JP | 2000-165368 | 6/2000 |
| JP | 2000-188593 | 7/2000 |
| JP | 2000-261421 | 9/2000 |
| JP | 2003-209516 | 7/2003 |
| JP | 2005-33537 | 2/2005 |
| JP | 3825319 | 7/2006 |
| WO | 01/15347 A1 | 3/2001 |

OTHER PUBLICATIONS

Extended Search Report for corresponding European Application 06810334.0-2415; dated Feb. 16, 2011.

Japanese Office Action for corresponding Japanese Application 2008-535233; mailed Nov. 15, 2011.

* cited by examiner

COMMUNICATION APPARATUS AND SIGNAL TRANSMITTING METHOD

CROSS-REFERENCE TO RELATED APPLICATION

This application is a continuation of PCT international application Ser. No. PCT/JP2006/318638 filed on Sep. 20, 2006 which designates the United States, the entire contents of which are incorporated herein by reference.

FIELD

The embodiment(s) discussed herein is (are) directed to a communication apparatus and a signal transmitting method thereof.

BACKGROUND

To respond to an increase in data traffic typically found in the Internet, construction of high-speed and large-capacity optical access networks rapidly progresses. Recently, a gigabit-passive optical network (G-PON) in which a plurality of subscribers share an optical fiber cable while high-speed downstream transmission of 2.4 Gbps at the maximum is available is widely used as a high-speed optical access system for constructing an optical access network.

To achieve still higher speed transmission in the future, development of a bit-rate mixed PON system in which an optical access network that has already been constructed is utilized and at the same time high-speed transmission (for example, 10 Gbps) is available only to the subscribers who require high-speed transmission is expected from the economical point of view. For example, Japanese Laid-open Patent Publication No. H08-008954 discloses a technology that implements a bit-rate mixed PON system. According to the technology, a multi-rate burst circuit is provided to an optical network unit (ONU) for each subscriber. Thus, a plurality of bit rates can be mixed in the PON system.

In an optical access network, an optical network unit (ONU) that functions as a communication terminal apparatus located on a subscriber's side is configured to extract clock according to a waveform of a received signal and to perform various operations according to the clock. In an optical access network in which signals of a plurality of bit rates are transmitted, however, an ONU that supports only lower bit rate signals sometimes cannot correctly recognize a waveform while receiving a higher bit rate signal, and cannot normally extract clock from the received signal.

SUMMARY

According to an aspect of the invention, a communication apparatus time-division multiplexes a first signal transmitted at a first bit rate and a second signal transmitted at a second bit rate which is an integer multiple of the first bit rate, and sends out the first signal and the second signal to one line. The communication apparatus includes: a pulse generating unit that generates repetitive pulses having a width equal to a width of the first signal; and a pulse superimposing unit that superimposes the pulses generated by the pulse generating unit on the second signal.

According to another aspect of the invention, a signal transmitting method is applied to a communication apparatus that time-division multiplexes a first signal transmitted at a first bit rate and a second signal transmitted at a second bit rate which is an integer multiple of the first bit rate, and sends out the first signal and the second signal to one line. The signal transmitting method includes: generating repetitive pulses having a width equal to a width of the first signal; and superimposing the pulses generated at the generating on the second signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Preferred embodiments of the present invention will be explained with reference to accompanying drawings. Although a communication apparatus of the embodiments is described below as an optical line terminal (OLT), this is by way of example only. The following embodiments are also applicable to various other communication apparatuses.

Figure 1:
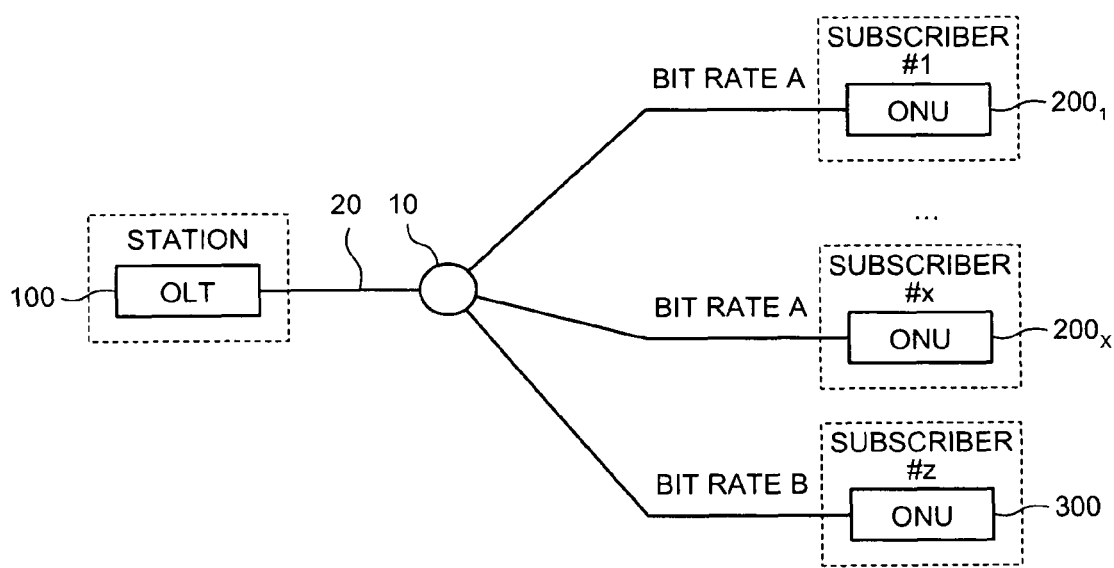
FIG. 1 is an example of an optical access network that contains a plurality of bit rates.

An optical access network that contains a plurality of bit rates is described in detail below. FIG. 1 is a diagram of an example of an optical access network which operates at a plurality of bit rates. The optical access network illustrated in FIG. 1 is constructed in a PON system. In the optical access network, an optical fiber cable 20 connected to an OLT 100 provided in a station is split by a power splitter 10, and is shared by ONUs $200_1$ to $200_X$ and 300 on the side of subscribers.

The optical access network of the example contains the ONUs $200_1$ to $200_X$ that perform communication at a bit rate A and the ONU 300 that performs communication at a bit rate B, which is M times higher than the bit rate A. At first, the optical access network runs at the bit rate A, and later, an ONU for subscriber #z is replaced by the ONU 300 and an OLT at the station is replaced by the OLT 100. Thus, the optical access network can contain the both bit rates.

In the network, information exchange between the OLT 100, the ONUs $200_1$ to $200_X$ and 300 is controlled with a time division system. For example, a downstream communication from the station to the subscribers is controlled with a time division multiplexing (TDM) system, and the OLT 100 transmits data while switching a destination ONU every time slot.

Figure 2:
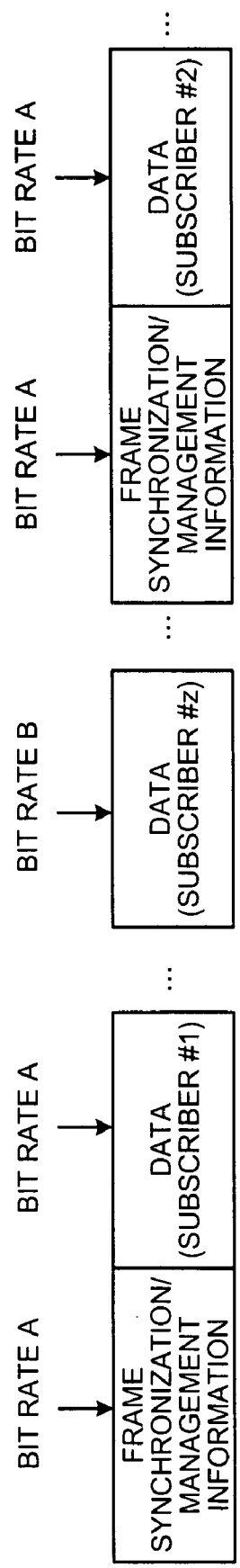
FIG. 2 is an example of a downstream signal.

FIG. 2 is a diagram of an example of a downstream signal. As illustrated in FIG. 2, the downstream signal is time division multiplexed, and transmitted so that data destined for a plurality of subscribers is mixed therein. The OLT 100 periodically generates frame synchronization/management information so that the ONUs $200_1$ to $200_X$ and 300 perform frame synchronization to acquire timing to obtain data destined for each ONU, and the signal is also reproduced as is the data and is contained in the downstream signal.

In a downstream communication, the same signal is transmitted to ONUs for all subscribers. Each of the ONUs $200_1$ to $200_X$ and 300 discards data destined for ONUs other than itself and processes only the frame synchronization/management information and the data destined therefor. Thus, a one-to-one connection is virtually established between the OLT 100 and the ONUs $200_1$ to $200_X$ and 300.

Focusing attention on bit rates, all the ONUs are required to read the frame synchronization/management information. Thus, the frame synchronization/management information is transmitted at the bit rate A. Time-division multiplexed data is transmitted corresponding to a bit rate supported by each destination ONU. For example, in an optical access network illustrated in FIG. 1, data destined for ONUs $200_1$ to $200_X$ are transmitted at a bit rate A and data destined for a ONU 300 is transmitted at a bit rate B.

Therefore, in an optical access network in which signals of a plurality of bit rates are transmitted, an ONU that supports only a lower bit rate may receive a higher bit rate signal in a certain period. An ONU is configured to extract clock according to a waveform of a received signal. While an ONU receives a higher bit rate signal not supported thereby, the ONU sometimes cannot recognize a waveform thereof and cannot operate normally.

Figure 15:
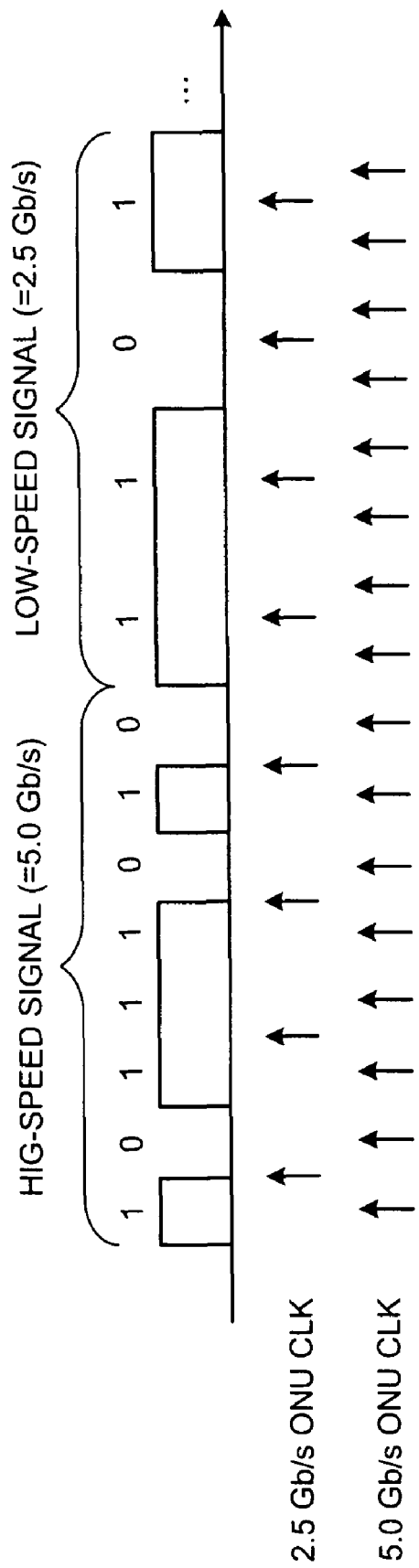
FIG. 15 is an example schematic diagram for explaining a conventional signal transmitting method.

A signal transmitting method according to the embodiment is described as compared to a conventional signal transmitting method. FIG. 15 is a diagram for explaining a conventional signal transmitting method. In FIG. 15 and the following examples, it is assumed that a 5.0-Gbps signal is transmitted as a high-speed signal and a 2.5-Gbps signal is transmitted as a low-speed signal.

As illustrated in FIG. 15, a high-speed ONU that supports 5.0 Gbps operates while extracting 5.0 Gbps clock. Even when receiving a 2.5-Gbps low-speed signal, the ONU can normally extract clock by taking it as if coupled two identical signals are transmitted sequentially. A low-speed ONU that supports 2.5 Gbps operates while extracting 2.5 Gbps clock. While receiving a 5.0-Gbps high-speed signal, however, the low-speed ONU cannot recognize the waveform of the signal because an unexpected higher frequency signal is transmitted. As a result, clock synchronization timing shifts.

Figure 16:
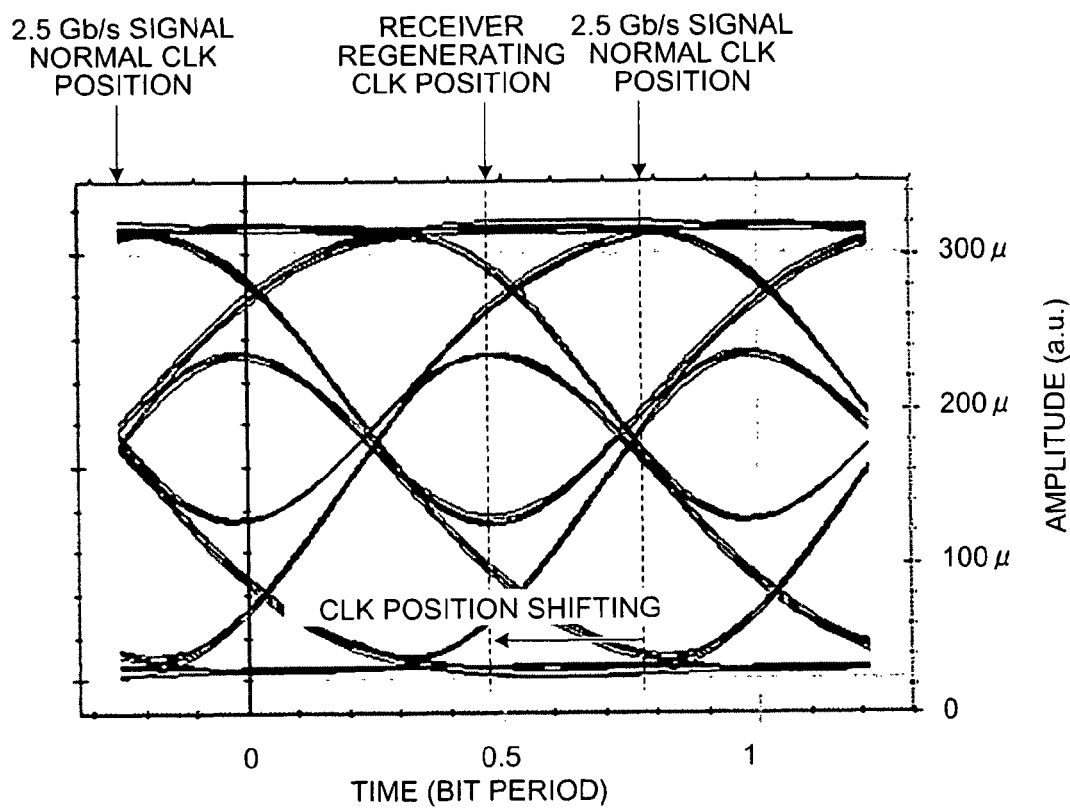
FIG. 16 is an example of a result that a low-speed ONU supporting 2.5 Gbps regenerates a 5.0-Gbps high-speed signal transmitted by the conventional signal transmitting method.

FIG. 16 is a diagram of an example of a result that a low-speed ONU supporting 2.5 Gbps regenerates a 5.0-Gbps high-speed signal transmitted by the conventional signal transmitting method. As indicated by the eye pattern in FIG. 16, the ONU that supports 2.5 Gbps cannot recognize a waveform of a 5.0-Gbps signal. Therefore, clock synchronization timing may be shifted from its normal position.

Figure 3:
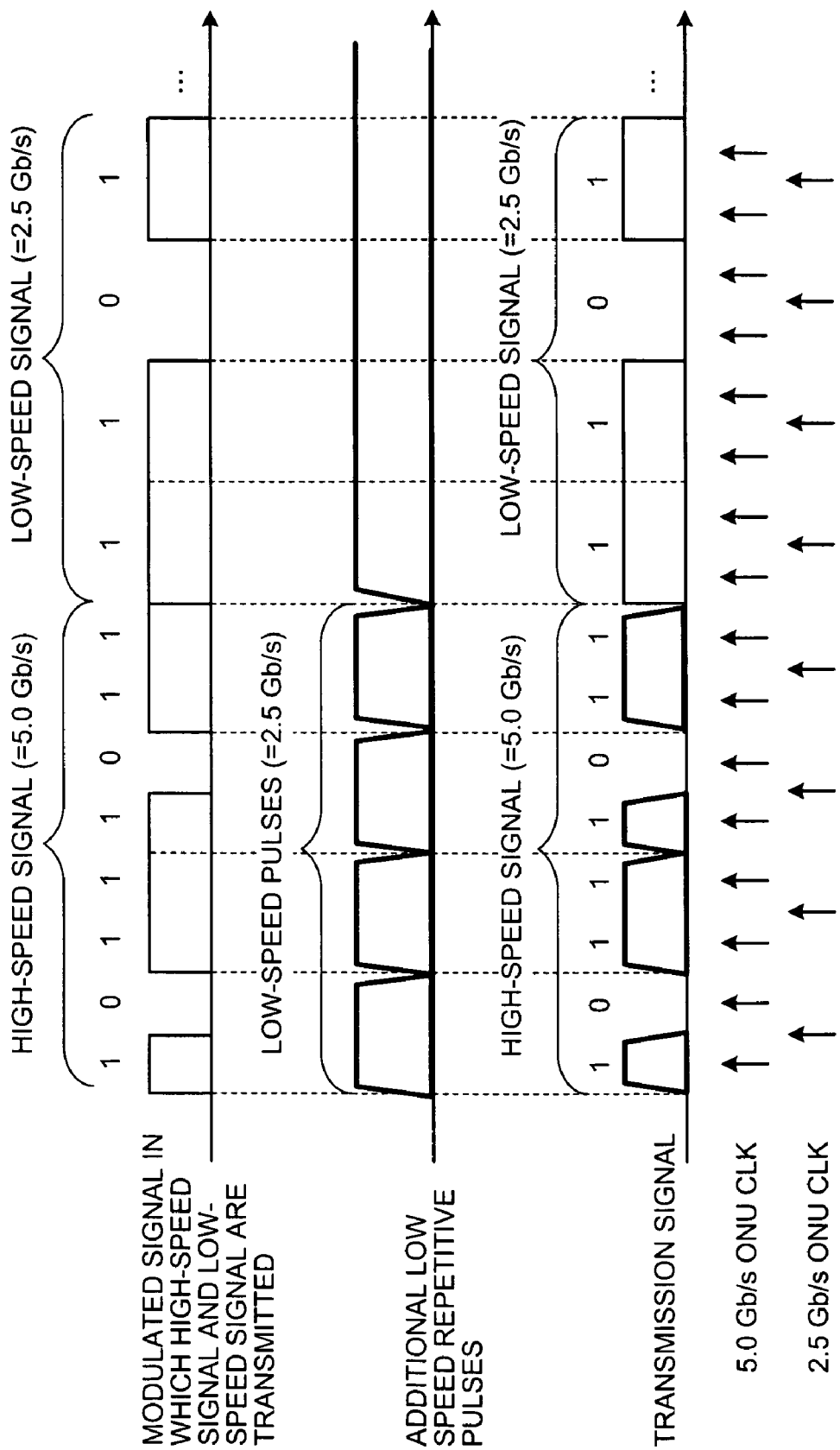
FIG. 3 is an example schematic diagram for explaining a signal transmitting method according to an embodiment of the present invention.

FIG. 3 is a diagram for explaining a signal transmitting method according to the embodiment. As illustrated in FIG. 3, in the signal transmitting method according to the embodiment, when a high-speed signal is transmitted, the high-speed signal is transmitted so that repetitive pulses having the same speed of the low-speed signal are superimposed thereon.

By superimposing repetitive pulses having the same speed of the low-speed signal, for example, a signal "111" that is conventionally interpreted as one waveform is divided into two signals "11" and "1". The former waveform "11" becomes a signal having the same width as the 2.5-Gbps signal and returns to zero once. Therefore, the low-speed ONU that supports 2.5 Gbps can normally extract clock more easily even while receiving a high-speed signal.

Figure 4:
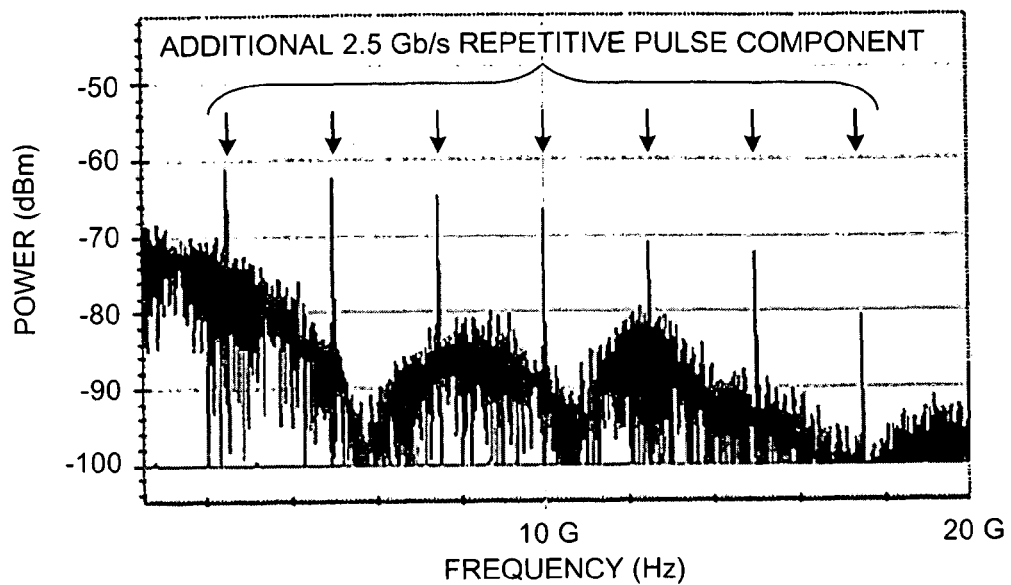
FIG. 4 is an example of an RF spectrum of a 5.0-Gbps signal transmitted by the signal transmitting method according to the embodiment.
Figure 17:
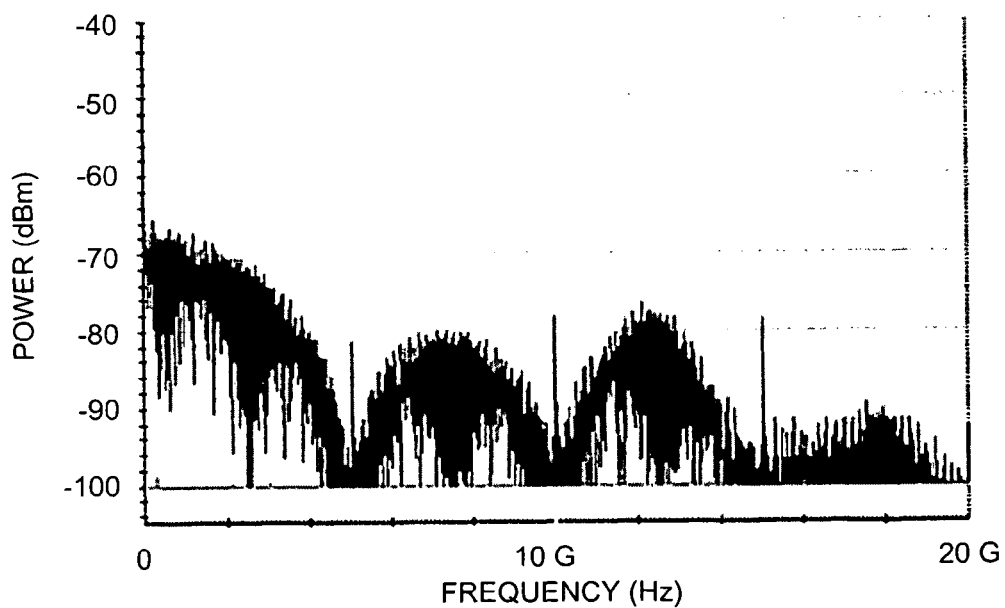
FIG. 17 is an example of an RF spectrum of a 5.0-Gbps signal transmitted by the conventional signal transmitting method.

FIG. 4 is a diagram of an example of a radio frequency (RF) spectrum of the 5.0-Gbps signal transmitted by the signal transmitting method according to the embodiment. FIG. 17 is a diagram of an example of an RF spectrum of a 5.0-Gbps signal transmitted by the conventional signal transmitting method. As illustrated, in the signal transmitting method according to the embodiment, a low-speed signal component that can be extracted by a low-speed ONU is applied to a high-speed signal. Therefore, the low-speed ONU can extract clock by using the low-speed signal component.

Figure 5:
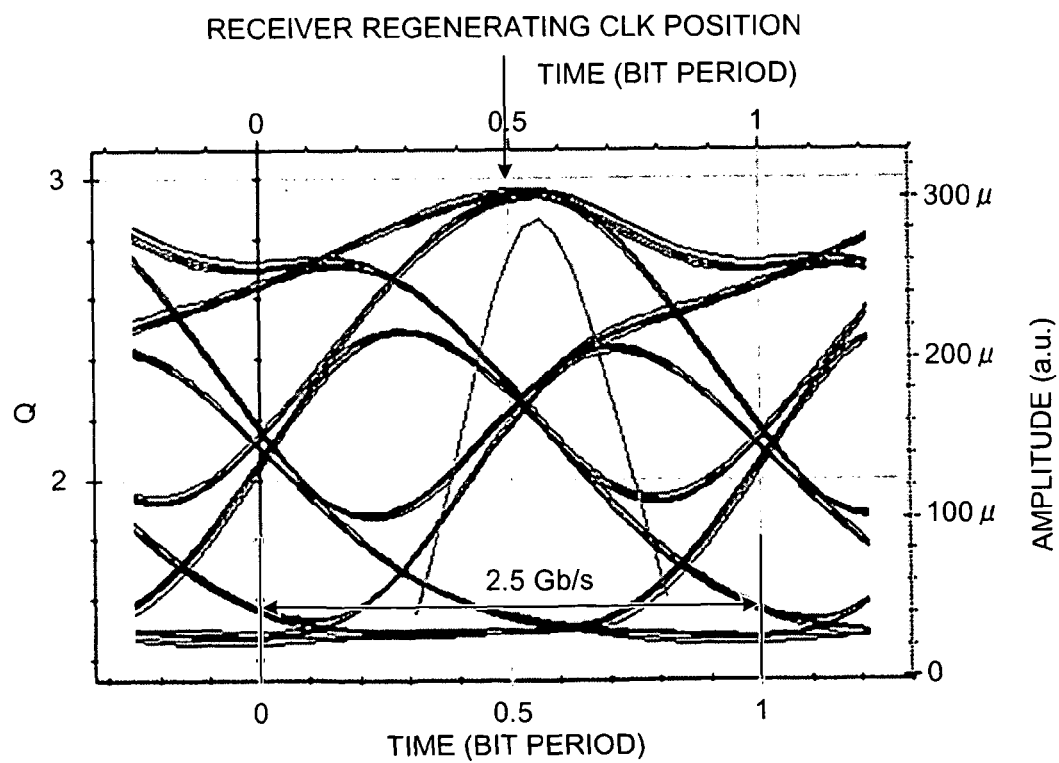
FIG. 5 is an example of a result that a low-speed ONU supporting 2.5 Gbps regenerates a 5.0-Gbps high-speed signal transmitted by the signal transmitting method according to the embodiment.

FIG. 5 is a diagram of an example of a result that a low-speed ONU supporting 2.5 Gbps regenerates a 5.0-Gbps high-speed signal transmitted by the signal transmitting method according to the embodiment. As indicated by the eye pattern in FIG. 5, the ONU that supports 2.5 Gbps can normally recognize clock synchronization timing even in receiving a 5.0-Gbps signal because repetitive pulses having the same speed as the low-speed signal are superimposed on the high-speed signal.

Figure 6:
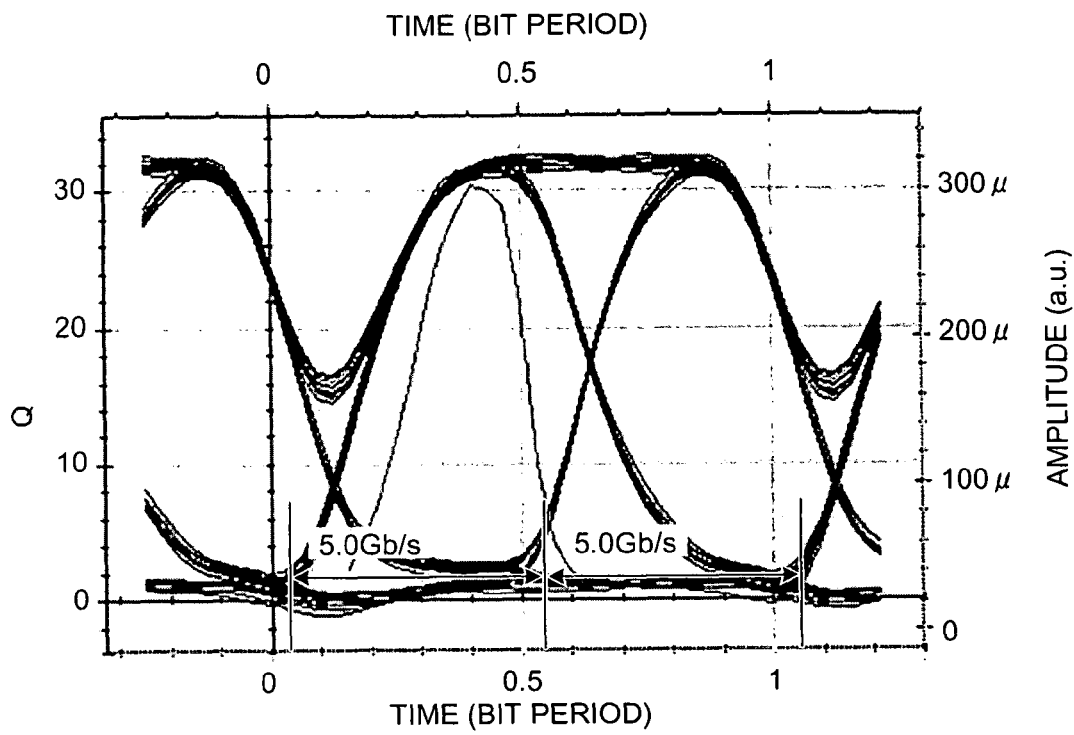
FIG. 6 is an example of a result that a high-speed ONU supporting 5.0 Gbps regenerates a 5.0-Gbps high-speed signal transmitted by the signal transmitting method according to the embodiment.

FIG. 6 is a diagram of an example that a high-speed ONU supporting 5.0 Gbps regenerates a 5.0-Gbps high-speed signal transmitted by the signal transmitting method according to the embodiment. As illustrated in FIG. 6, if repetitive pulses having the same speed as the low-speed signal are superimposed thereon, the ONU that supports 5.0 Gbps can normally recognize clock synchronization timing. Therefore, the high-speed ONU is not influenced by the superimposed pulses.

Figure 14:
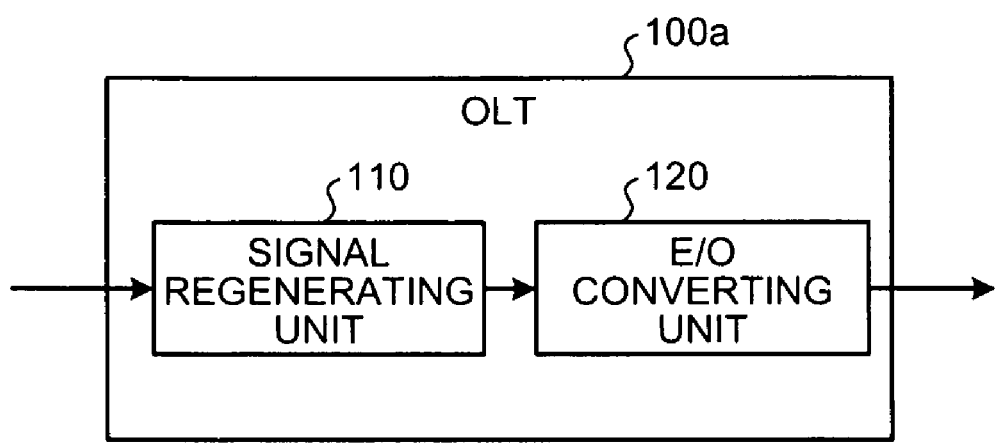
FIG. 14 is an example block diagram of a conventional OLT.

The configuration of an OLT that transmits a signal using the signal transmitting method according to the embodiment is described in detail below in comparison with that of a conventional OLT. FIG. 14 is a block diagram of a conventional OLT. In FIG. 14, part of the configuration not related to signal transmission are not illustrated for simplicity.

As illustrated in FIG. 14, a conventional OLT 100a includes a signal regenerating unit 110 and an electrical/optical (E/O) converting unit 120. The signal regenerating unit 110 regenerates a signal in which data destined for each ONU and frame synchronization/management information are multiplexed in the same line in a TDM system. The E/O converting unit 120 converts an electrical signal output by the signal regenerating unit 110 into an optical signal by using a device such as a directly modulated laser diode, and sends out the optical signal to the optical access network.

Figure 7:
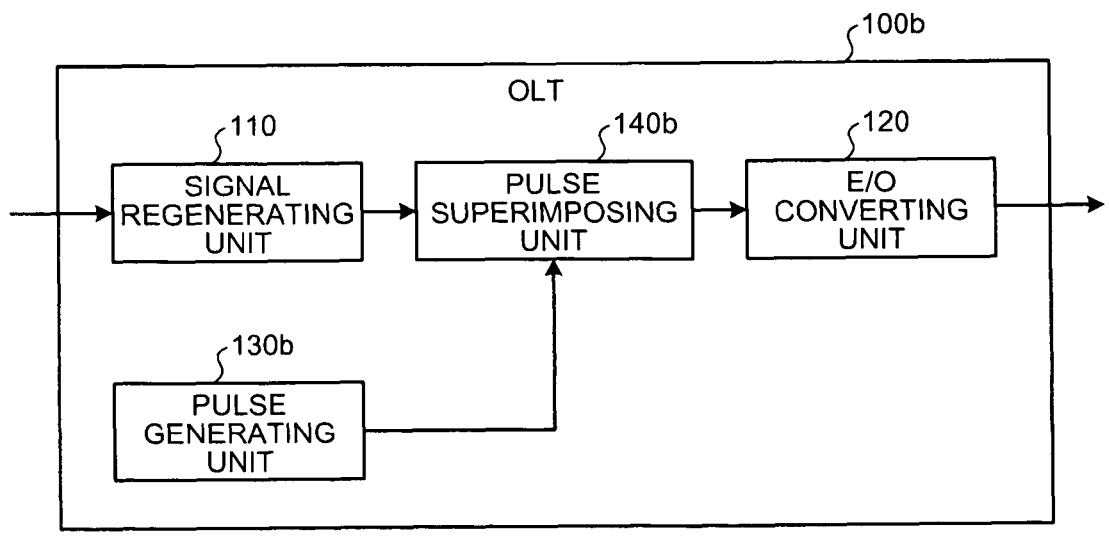
FIG. 7 is an example block diagram of an OLT according to the embodiment.

FIG. 7 is a block diagram of an OLT according to the embodiment. Also in FIG. 7, part of the configuration not related to signal transmission are not illustrated for simplicity.

As illustrated in FIG. 7, an OLT 100b according to the embodiment includes the signal regenerating unit 110, a pulse generating unit 130b, a pulse superimposing unit 140b, and the E/O converting unit 120. The signal regenerating unit 110 and the E/O converting unit 120 are similar to those of FIG. 14, and therefore, their description is not repeated.

The pulse generating unit 130b generates repetitive pulses having the same speed as the low-speed signal. The pulse superimposing unit 140b superimposes the repetitive pulses generated by the pulse generating unit 130b on an electrical signal output by the signal regenerating unit 110, and outputs the electrical signal to the E/O converting unit 120. The repetitive pulses having the same speed as the low-speed signal may be superimposed thereon not only when a high-speed signal is sent out, but also when a low-speed signal is sent out.

The OLT 100b is configured so that the pulse superimposing unit 140b generates repetitive pulses having the same speed as the low-speed signal and the pulse superimposing unit 140b superimposes the repetitive pulses on a communication signal. Therefore, a low-speed ONU that receives a signal sent out by the OLT 100b can correctly extract clock even when receiving a high-speed signal.

A high-speed signal is preferably removed properly so that the low speed repetitive pulses that are superimposed on a high-speed signal are correctly recognized. A high-speed signal can be removed, for example, by using a low speed photoreceptor that does not respond to a high frequency component or a filter that blocks a higher frequency component.

Figure 8:
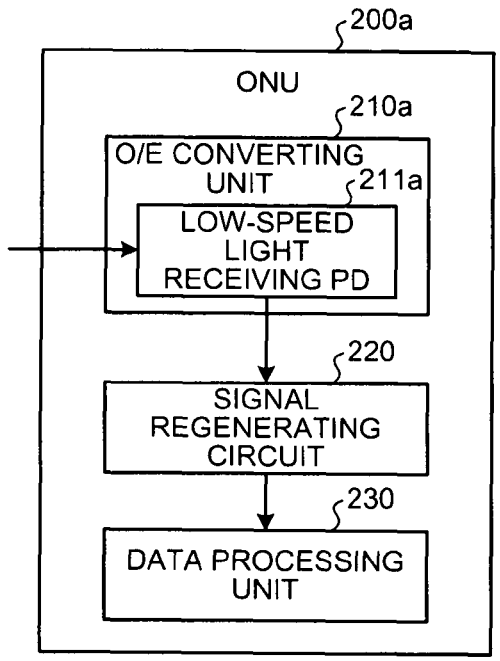
FIG. 8 is an example block diagram of an ONU that includes a low speed photoreceptor.

FIG. 8 is a block diagram of an ONU that includes a low speed photoreceptor. As illustrated in FIG. 8, a low-speed ONU 200a includes an O/E converting unit 210a that converts an optical signal into an electrical signal, a signal regenerating circuit 220 that extracts clock according to the electrical signal converted by the O/E converting unit 210a and regenerates the electrical signal into a digital signal, and a data processing unit 230 that performs various data processing according to the digital signal regenerated by the signal regenerating circuit 220. By using a low-speed light receiving photodiode (PD) 211a for optical signal conversion performed by the O/E converting unit 210a, a high-speed signal is removed prior to clock extraction performed by the signal regenerating circuit 220.

Figure 9:
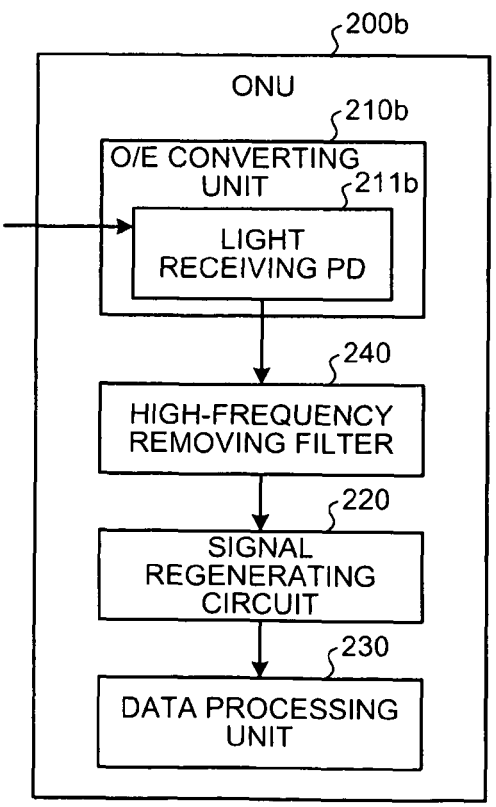
FIG. 9 is an example block diagram of an ONU that includes a filter that blocks a high frequency component.

FIG. 9 is a block diagram of an ONU that includes a filter that blocks a high frequency component. As illustrated in FIG. 9, a low-speed ONU 200b includes an O/E converting unit 210b including a light receiving photodiode 211b that converts an optical signal to an electrical signal, a high-frequency removing filter 240 that blocks a high frequency component of the electrical signal converted by the O/E converting unit 210b, the signal regenerating circuit 220 that extracts clock according to the electrical signal from which a high frequency component is removed by the high-frequency removing filter 240 and regenerates the electrical signal into a digital signal, and the data processing unit 230 that performs various data processing according to the digital signal regenerated by the signal regenerating circuit 220.

A mechanism that thus removes a high-speed signal properly is already included in an ONU that is widely used in general. When a part of an optical access network is speeded up, such a mechanism can be used for removing a high-speed signal to be mixed and for facilitating recognition of the low-speed repetitive pulses transmitted by the signal transmitting method according to the embodiment.

As described above, according to the first embodiment, in a network in which a low-speed signal and a high-speed signal having the speed of an integer multiple of the speed of the low-speed signal are time-division multiplexed and then transmitted, when the high-speed signal is sent out, repetitive pulses having the same speed as the low-speed signal are superimposed thereon. Therefore, a communication terminal apparatus that does not support high-speed signals can correctly extract clock from a received signal.

In the first embodiment, an example is described that low-speed repetitive pulses are superimposed on a high-speed signal before an electrical signal is converted into an optical signal in an OLT so that a low-speed ONU can correctly extract clock even when receiving a high-speed signal. Low-speed repetitive pulses can be, however, superimposed thereon after an electrical signal is converted into an optical signal.

Figure 10:
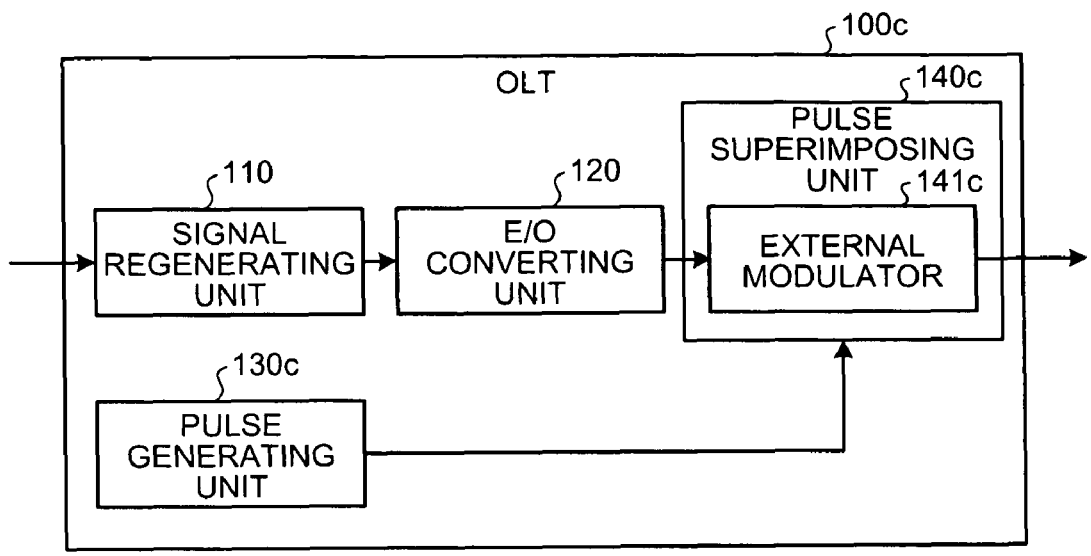
FIG. 10 is an example block diagram of an OLT that converts an electrical signal into an optical signal and superimposes a low-speed pulse thereon.

FIG. 10 is a block diagram of an OLT that converts an electrical signal into an optical signal and superimposes a low-speed pulse thereon. As illustrated in FIG. 10, an OLT 100c according to the embodiment includes the signal regenerating unit 110, the E/O converting unit 120, a pulse generating unit 130c, and a pulse superimposing unit 140c. The signal regenerating unit 110 and the E/O converting unit 120 are similar to those of FIG. 14, and therefore, their description is not repeated.

The pulse generating unit 130c generates repetitive pulses having the same speed as the low-speed signal. The pulse superimposing unit 140c superimposes the repetitive pulses generated by the pulse generating unit 130c on an optical signal converted by the E/O converting unit 120, and the pulse superimposing unit 140c includes an external modulator 141c.

The OLT 100c is configured so that the pulse generating unit 130c generates repetitive pulses having the same speed as the low-speed signal and the pulse superimposing unit 140c superimposes the pulses on an optical signal by using the external modulator 141c. Therefore, the low-speed ONU that receives signals sent out by the OLT 100c can correctly extract clock even when receiving a high-speed signal.

Figure 11:
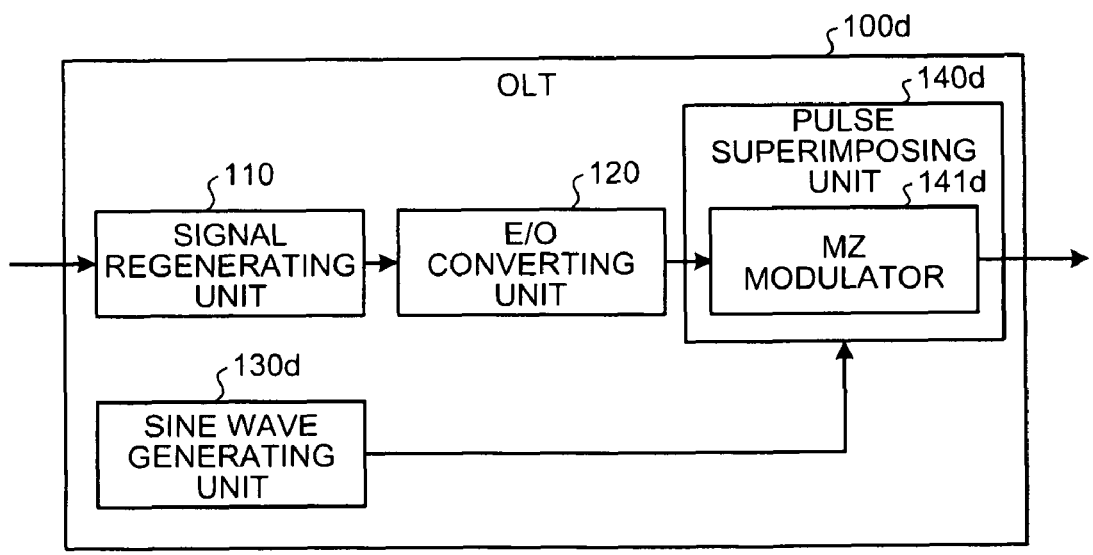
FIG. 11 is an example block diagram of an OLT that includes a MZ modulator.

A Mach-Zehnder (MZ) modulator may also be used for superimposing repetitive pulses having the same speed as the low-speed signal on an optical signal. FIG. 11 is a block diagram of an OLT that includes an MZ modulator. As illustrated in FIG. 11, an OLT 100d includes the signal regenerating unit 110, the E/O converting unit 120, a sine wave generating unit 130d, and a pulse superimposing unit 140d. The signal regenerating unit 110 and the E/O converting unit 120 are similar to those of FIG. 14, and therefore, their description is not repeated.

Figure 12:
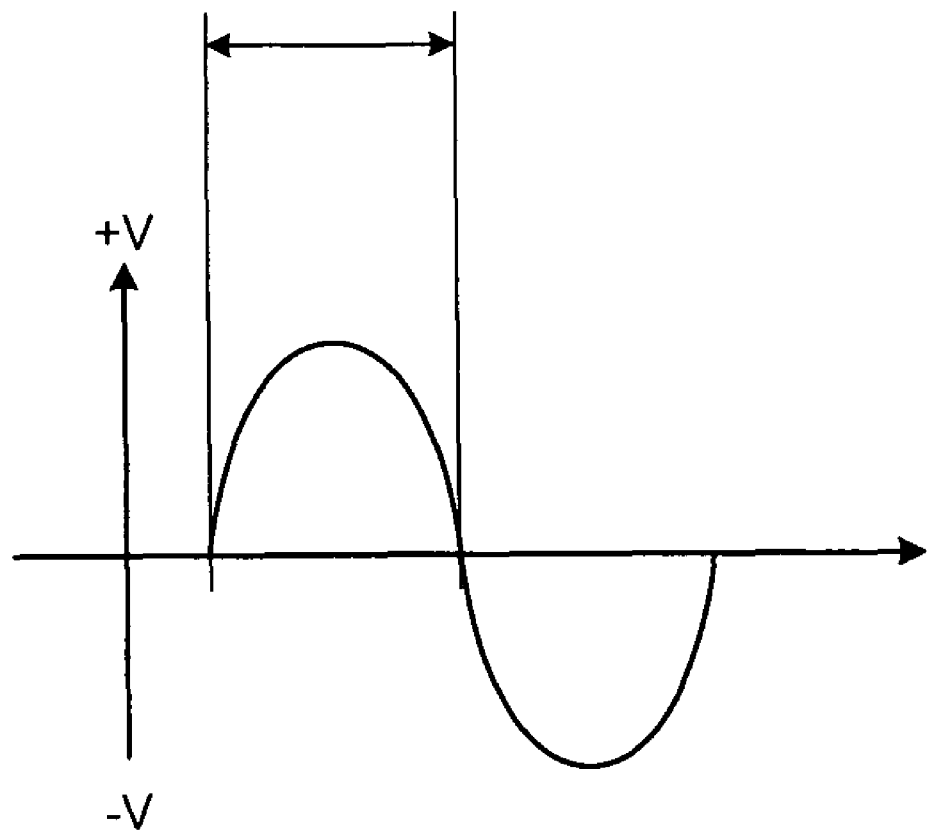
FIG. 12 is an example of a sine wave having a length whose half cycle is equal to a signal width of a low-speed signal.
Figure 13:
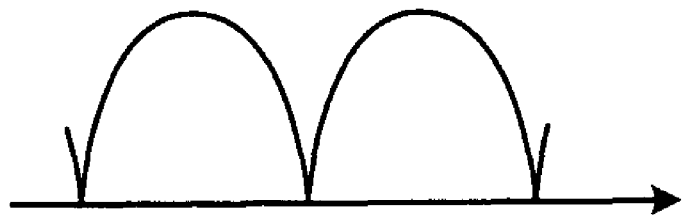
FIG. 13 is an example of a repetitive pulse having the same speed as the low-speed signal.

The sine wave generating unit 130d generates a sine wave having a length whose half cycle is equal to the signal width of the low-speed signal as illustrated in FIG. 12. The pulse superimposing unit 140d includes an MZ modulator 141d. The MZ modulator 141d generates repetitive pulses having the same speed as the lower signal as illustrated in FIG. 13 by inverting the phase of the sine wave input by the sine wave generating unit 130d, and superimposes the repetitive pulses on the optical signal that is generated by the signal regenerating unit 110 and is converted by the E/O converting unit 120.

Thus, using the MZ modulator facilitates superimposition of low speed repetitive pulses just by generating a simple sine wave.

As described above, according to the second embodiment, pulses are superimposed by using an external modulator. Therefore, after an electrical signal is converted into an optical signal, pulses for extracting low-speed clock can be superimposed thereon. Repetitive pulses having the same width as the low-speed signal are generated by inverting a sine wave. Thus, repetitive pulses can be easily generated. The signal used here is not limited to a sine wave, and may be any signal as long as it is a inverted signal having a length whose half cycle is equal to the signal width of the low-speed signal.

In the above embodiments, an example is described of a PON optical access network in which a 2.5-Gbps signal is transmitted as the low-speed signal and a 5.0-Gbps signal is transmitted as the high-speed signal. However, as long as the speed of the high-speed signal is an integer multiple of the low-speed signal, the present invention is applicable to any other networks, for example, a network in which a 2.5-Gbps signal and a 10-Gbps signal are mixed.

While in the above embodiments, an example is illustrated in which a return-to-zero signal is superimposed, a signal to be superimposed may not be a return-to-zero signal as long as the signal has the same cycle as the lower signal. In the above embodiments, an example is described in which the present invention is applied to a PON optical access network. However, the present invention can also be applied to any other networks that require extraction of one clock having the frequency of an integer multiple of another clock.

As set forth hereinabove, according to an embodiment of the invention, in a network in which a low-speed signal and a high-speed signal having the speed of an integer multiple of the speed of the low-speed signal are time-division multiplexed and transmitted, when the high-speed signal is sent out, a repetitive pulse having the same width as the low-speed signal is superimposed on the high-speed signal and transmitted. Thus, even a communication terminal apparatus that does not support high-speed signals can extract clock correctly from a received signal.

Moreover, a sine wave is inverted to generate a repetitive pulse having the same width as a low-speed signal. Thus, repetitive pulses can be easily generated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication apparatus that time-division multiplexes a first signal transmitted at a first bit rate and a second signal transmitted at a second bit rate which is an integer multiple of the first bit rate, and sends out the first signal and the second signal to one line, the communication apparatus comprising:
a pulse generating unit that generates repetitive pulses, each of the repetitive pulses having a width equal to a width of the first signal; and
a pulse superimposing unit that superimposes the pulses generated by the pulse generating unit on the second signal, wherein
the second bit rate is at least two times the first bit rate.

2. The communication apparatus according to claim 1, further comprising a converting unit that converts a time-division multiplexed electrical signal to an optical signal, wherein
the line is a passive optical access network line.

3. The communication apparatus according to claim 2, wherein the pulse superimposing unit superimposes the pulses on the electrical signal before the converting unit converts the electrical signal into the optical signal.

4. The communication apparatus according to claim 2, wherein the pulse superimposing unit superimposes the pulses on the optical signal after the converting unit converts the electrical signal into the optical signal.

5. The communication apparatus according to claim 4, further comprising a sine wave generating unit that generates a sine wave having a length whose half cycle is equal to a width of the first signal, wherein
the pulse generating unit generates the repetitive pulses by inverting the sine wave generated by the sine wave generating unit.

6. A signal transmitting method applied to a communication apparatus that time-division multiplexes a first signal transmitted at a first bit rate and a second signal transmitted at a second bit rate which is an integer multiple of the first bit rate, and sends out the first signal and the second signal to one line, the signal transmitting method comprising:
generating repetitive pulses, each of the repetitive pulses having a width equal to a width of the first signal; and
superimposing the pulses generated at the generating on the second signal, wherein the second bit rate is at least two times the first bit rate.

7. The signal transmitting method according to claim 6, further comprising converting a time-division multiplexed electrical signal to an optical signal, wherein
the line is a passive optical access network line.

8. The signal transmitting method according to claim 7, wherein the superimposing includes superimposing the pulses on the electrical signal before the electrical signal is converted into the optical signal at the converting.

9. The signal transmitting method according to claim 7, wherein the superimposing includes superimposing the pulses on the optical signal after the electrical signal is converted into the optical signal at the converting.

10. The signal transmitting method according to claim 9, further comprising generating a sine wave having a length whose half cycle is equal to a width of the first signal, wherein
the generating repetitive pulses includes generating the repetitive pulses by inverting the sine wave generated at the generating a sine wave.

* * * * *